United States Patent
Tahernezhaadi

(10) Patent No.: US 6,920,219 B2
(45) Date of Patent: Jul. 19, 2005

(54) METHOD AND APPARATUS FOR PROVIDING ECHO CANCELLATION

(75) Inventor: Mansour Tahernezhaadi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 85 days.

(21) Appl. No.: 10/159,376

(22) Filed: May 31, 2002

(65) Prior Publication Data

US 2003/0223573 A1 Dec. 4, 2003

(51) Int. Cl.[7] .............................................. H04M 9/08
(52) U.S. Cl. ........................... 379/406.01; 379/406.04; 370/286; 370/292
(58) Field of Search ...................... 379/406.01–406.16

(56) References Cited

U.S. PATENT DOCUMENTS

| | | | | |
|---|---|---|---|---|
| 5,526,353 A | * | 6/1996 | Henley et al. ............. | 370/60.1 |
| 5,883,891 A | * | 3/1999 | Williams et al. ............ | 370/356 |
| 6,208,618 B1 | * | 3/2001 | Kenney et al. ............. | 370/216 |
| 6,504,838 B1 | * | 1/2003 | Kwan ......................... | 370/352 |
| 6,580,793 B1 | * | 6/2003 | Dunn et al. ............. | 379/406.04 |
| 2001/0028634 A1 | * | 10/2001 | Huang et al. ............... | 370/252 |
| 2002/0031086 A1 | * | 3/2002 | Welin ......................... | 370/229 |

FOREIGN PATENT DOCUMENTS

EP  0194785 A2 * 9/1986 ............ H04B/3/20

* cited by examiner

Primary Examiner—Forester W Isen
Assistant Examiner—Ramnandan Singh

(57) ABSTRACT

A method for providing echo cancellation between a first and second communication unit detects an echo condition (200) between first and second communication units. In addition, the method includes detecting whether a decoded near end audio packet contains a suitable level of background noise to be used as a background noise packet. If so, the current near end encoded audio packet is stored (202) in a buffer (26), such as a circular buffer. Previous near end encoded audio packets (42) that are also determined to have a suitable level of background noise based on their decoded corresponding counterparts are also stored in the circular buffer. When an echo condition is detected with respect to a current near end encoded audio packet, the method includes substituting a previous near end encoded audio packet stored in the buffer as the next encoded audio packet for transmission (204).

17 Claims, 3 Drawing Sheets

METHOD AND APPARATUS FOR PROVIDING ECHO CANCELLATION

BACKGROUND OF THE INVENTION

The invention relates generally to communication systems and more particularly to communications systems that employ echo detection and echo cancellation.

Packet switched networks for transmission of voice signals and other information have gained tremendous impetus in recent years, wherein, for example, coded audio packets, such as coded speech packets or other audio packets are routed through public (internet, voice over IP) or private networks (intranets) out to a destination point. With conventional systems, it is assumed that speech quality improvement such as acoustic echo cancellation, noise suppression and volume level adjustment has been addressed prior to encoding speech packets at the point of packet origination by an originating unit such as a wireless or non-wireless Internet appliance, portable communication device, non-portable device, or any other suitable device.

As known in the art, speech samples are echo canceled (due to the presence of acoustic echo from, for example, a sending unit (far end) as received by a receiving unit (near end) noise suppressed and level adjusted (automatic gain control) followed by encoding to produce encoded audio packets for transmission to a destination unit. Near end encoded audio packets are typically those transmitted to a network element from, for example, a wireless mobile unit whereas far end encoded audio packets are those encoded by another wireless mobile unit that is communicating with the transmitting mobile unit. In an internet protocol system, transmitted speech packets are routed to a receiving unit through a network element. For example, an ISP gateway routes the packets through the Internet or intranet to an ISP gateway associated with a receiving unit where the speech packets are subsequently transmitted to an end user for decoding. Hence, speech samples are echo cancelled, noise suppressed and encoded to produce encoded audio packets for transmission to another user. Although it is assumed by the infrastructure, such as the ISP gateway, that echo cancellation has been adequately addressed at the point of origination by the transmitting unit, a problem can arise if an inadequate level of echo cancellation is performed by the sending unit. Accordingly, it would be desirable to provide an independent echo cancellation process, preferably by an immediate infrastructure unit (for example, an immediate ISP gateway) associated with the transmitting unit.

To provide echo cancellation, it has been proposed to insert background noise packets in place of packets that contain undesirable amount of echo. However, such systems, typically require the decoding of an encoded speech packet prior to performing echo detection and cancellation and then re-encoding the speech packet for routing to a destination unit. The re-encoding process can consume enormous computational resources and tandem vocoding, such as decoding and encoding then decoding, can undermine overall speech quality.

Accordingly, gateways or other network elements that employ packet decoders that decode incoming encoded speech packets and perform echo cancellation and noise suppression and then re-encode the echo cancelled packets for those packets determined to require echo cancellation can add additional delays due to the re-encoding of the modified speech packets.

Also, it is typically more desirable to insert background noise as part of an echo cancellation process than utilize pure erasure packets since erasure packets can yield a complete muting of speech, which may be objectionable from a subjective listening point of view. Therefore, some level of background noise, sometimes referred to as comfort noise packets, may be more desirable than utilizing erasure packets.

Accordingly, it would be desirable to eliminate the need for re-encoding of audio packets and still facilitate a suitable form of echo cancellation without adding significant delay or unsuitable processing demands.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Figure 1:
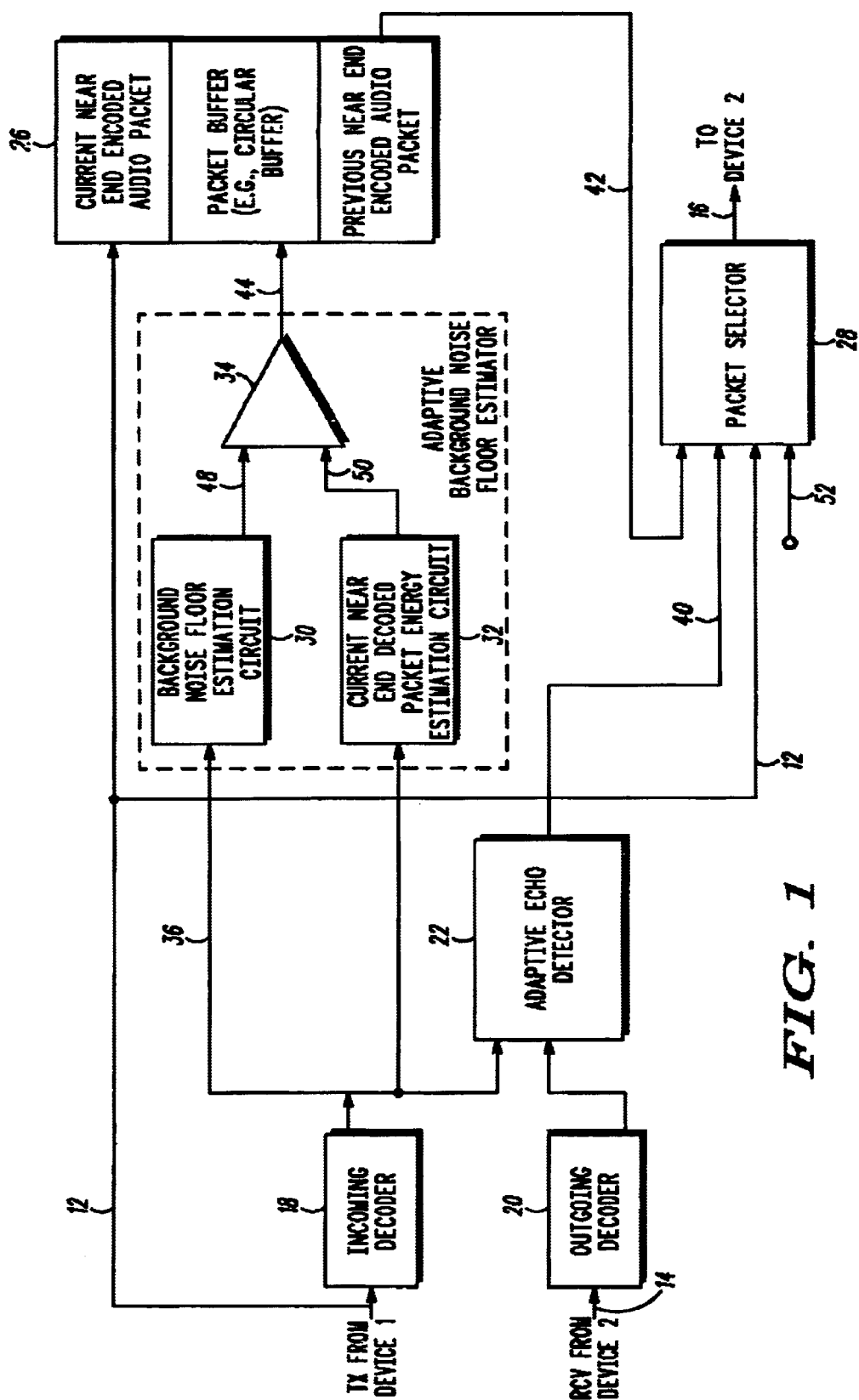
FIG. 1 is a block diagram illustrating one example of a network element in accordance with one embodiment of the invention.

A method for providing echo cancellation between a first and second communication unit detects an echo condition between the first and second communication units. In addition, the method includes detecting whether a decoded near end audio packet contains a suitable level of background noise to be used as a background noise packet. If so, the corresponding encoded version of the packet, namely the current near end encoded audio packet is stored in a buffer, such as a circular packet buffer. Previous near end encoded audio packets that are also determined to have a suitable level of background noise based on their decoded corresponding counterparts are also stored in the circular buffer. When an echo condition is detected with respect to a current near end encoded audio packet, the method includes substituting a previous near end encoded audio packet stored in the buffer as the next encoded audio packet for transmission. As such, a detected echo packet is replaced by a spectrally matched background noise packet that is already encoded, out of the circular buffer.

In one embodiment, a network element employs an adaptive echo detector to detect an echo condition between a current decoded near end audio packet and a far end decoded audio packet. In addition, the network element includes an adaptive background noise floor estimator that produces a background noise encoded packet storage control signal that indicates whether a previously stored encoded near end audio packet should replace a current encoded near end audio packet that has been determined to include echo. In one example, the adaptive background noise floor estimator determines a background noise energy floor value and saves those packets in the circular buffer whose energy is within a predetermined threshold of the estimated background noise floor. The circular buffer preferably has a minimum configurable size. A current near end decoded packet energy value is compared to the background noise energy floor value to determine whether the packet being evaluated has a background noise level within the threshold of the background noise energy floor value. This process is used to determine whether the packet being analyzed can be used as a background noise packet. The circular buffer stores a copy of received near end encoded audio packets that do not undergo re-encoding. Accordingly, delays are reduced and computational complexity is reduced compared to other systems that require re-encoding of echo cancelled packets.

The buffer, such as a circular packet buffer, contains previously received encoded near end audio packets determined to be background noise packets and stores a current near end encoded packet that has been determined to be background noise packet, in response to a packet noise encoded packet storage control signal. A packet selector substitutes at least one previous near end encoded audio packet stored in the circular encoded packet buffer as a next encoded packet for transmission when a current encoded near end audio packet has been determined to contain echo.

FIG. 1 illustrates one example of a network element 10 such as an ISP gateway, or any other suitable network element. The network element 10 may be, for example, a transcoder employed in a CDMA communication system, an ISP gateway or any other suitable network element. The network element 10 receives near end encoded audio packets 12 that are transmitted by a first communication unit, such as a wireless PDA, internet appliance, telephone or non-wireless device and also receives from a far end encoded audio packets 14 associated with an echo generating communication unit such as a second communication unit. The network element 10 outputs encoded audio packets 16 for transmission to the second communication unit. For purposes of simplicity, the invention will be described with reference to communication in a reverse link communication, however it will be recognized that the invention may be employed in another network element associated with the second communication unit that effectively has a duplicate set of circuits described herein to carry out a similar operation with respect to encoded packets received from the second communication unit and considered to be near end encoded audio packets from the perspective of the second communication unit. This scenario would occur, for example, with forward link communications.

The network element 10 includes an incoming decoder 18, an outgoing decoder 20, an adaptive echo detector 22, an adaptive background noise floor estimator 24, a buffer 26, such as a circular buffer (e.g., LIFO buffer) which is referred to herein as a circular encoded buffer, and a packet selector 28. The incoming decoder 18 and the outgoing decoder 20 may be any suitable decoders as known in the art. The adaptive echo detector 22, the adaptive background noise floor estimator 24 and the packet selector 28 may be implemented as software modules executed by one or more processing devices. However, it will be recognized that any suitable hardware, software or firmware structure or any suitable combination thereof may also be used. For example, the adaptive echo detector 22, adaptive background noise floor estimator 24 and the packet selector 28 may be implemented using DSPs, discrete logic, microprocessors, microcomputers, state machines, or any other suitable hardware, firmware, software or combination thereof.

The adaptive background noise floor estimator 24 includes a background noise floor energy level estimation circuit 30, a current near end decoded packet energy estimation circuit 32 and a comparator circuit 34. The incoming decoder 18 receives a current near end encoded audio packet 12 and decodes the packet to produce a decoded current near end audio packet 36 which is received by the adaptive echo detector 22 and the adaptive background noise floor estimator 24. The outgoing decoder 20 receives an encoded far end audio packet 14 and decodes the packet to produce a far end decoded audio packet 38 which is also received by the adaptive echo detector 22. The adaptive echo detector 22 performs conventional adaptive echo detection on the decoded current near end audio packet to detect an echo condition. If an echo condition is detected, the adaptive echo detector 22 generates an echo detection signal 40 indicating whether an echo condition is detected. For example, the echo detection signal may be a flag, multiple bits or analog signal indicating whether the current near end decoded packet is considered to contain undesirable amounts of echo. It also indicates whether the packet does not contain echo. When an echo condition is detected, the echo detection signal causes the packet selector 28 to substitute a previous near end encoded audio packet 42, that does not undergo decoding and re-encoding, to be output from the buffer 26 as the next encoded audio packet 16 for transmission.

The adaptive background noise floor estimator 24 determines whether a received packet contains a suitable level of background noise so that the packet can be stored in an encoded form in the buffer 26 for later output as a replacement for a packet determined to contain echo. The adaptive background noise floor estimator 24 receives the current near end decoded audio packet 36 and produces a background noise encoded packet storage control signal 44. The background noise encoded packet storage control signal 44 indicates whether the buffer 26 should store a current near end encoded audio packet 12, that has not undergone re-encoding, as a background noise packet. As such, as incoming packets are received, buffer 26 is populated with previously received near end encoded audio packets determined to be background noise packets and stores a current near end encoded audio packet 12 as determined to contain background noise. This is done when the background noise encoded packet storage control signal 44 indicates that the packet contains background noise.

The background noise floor energy level estimation circuit 30 receives the current near end decoded packet 36 and produces a background noise energy floor value 48. The current near end decoded packet energy estimation circuit 32 receives the current near end decoded packet 36 and produces a current near end decoded packet energy value 50. The comparator circuit 34 receives the background noise energy floor value 48 and the current near end decoded packet energy value 50 to produce the background noise encoded packet storage control signal 44 based on the comparison of the background noise energy floor value 48 and the current near end decoded packet energy value 50. For example, the background noise floor energy level estimation circuit 30 estimates the noise floor of reverse link decoded packets. A current near end decoded packet energy is compared to the estimated background noise floor by the comparator circuit 34. Those packets whose energy is within, for example 5 dB of the estimated background noise floor, are considered to have suitable background noise and are selected to be stored in their encoded form in the buffer 26.

As such, upon detection of echo packets, echo packets are replaced by non-re-encoded spectrally matched comfort noise packets. These may be, for example, one-eighth rate packets in a system such as a CDMA system employing variable rate vocoders where EVRC, 13KQCELP, and 8KQCELP vocoders are employed. In addition, providing spectrally matched background noise packets in place of echo packets can be minimally disruptive to vocoder parameter history in comparison to employing eraser insertion. Hence, if the adaptive echo cancellation algorithm converges to a stable and significant echo path, the network element 10 upon identifying a packet as an echo packet replaces the next packet for transmission by a spectrally matched encoded background noise packet out of the buffer 26.

The buffer 26 is preferably a circular buffer and during a session start up, is initialized to contain all erasure packets. However, any suitable buffer arrangement may be used.

The packet selector 28 is operatively responsive to the echo detection signal 40 to select at least one of a current near end encoded audio packet 12 and an encoded audio packet such as a previously stored near end encoded audio packet 42, from the buffer 26 as a next encoded packet 16 for transmission. To determine when to output the next packet, the packet selector 28 receives a next encoded packet signal 52 which indicates the start of the transmission of the next packet for output. As such, the packet selector 28 outputs at least one of the current near end encoded audio packet 12 or an encoded audio packet from the circular buffer 26 as the next encoded packet 16 for transmission depending upon the state of the echo detection signal 40. If the echo detection signal 40 indicates that the current near end decoded audio packet is an echo packet, the next packet to be transmitted is substituted with an already encoded background noise packet, i.e., a previously stored near end encoded audio packet 42, from the buffer 26. The buffer 26 contains already encoded packets that are determined to contain suitable levels of background noise when they are decoded. However, these packets are not re-encoded. Instead, the received near end encoded audio packets are passed to the buffer 26 and are only stored in the buffer 26 if it is determined that they have a suitable background noise level. The packet selector 28 selects a current encoded near end audio packet 12 as a next encoded packet 16 for transmission when an echo condition is not detected. As noted above, alternatively, the packet selector 28 selects an encoded audio packet such as a previously stored near end encoded audio packet 42 from the buffer 26 as a next encoded packet for transmission when an echo condition on a current packet is detected.

It will be recognized that although the network element 10 is shown to perform the functionality described above, the described operations may be distributed among a plurality of network elements depending upon a desired system structure.

Figure 2:
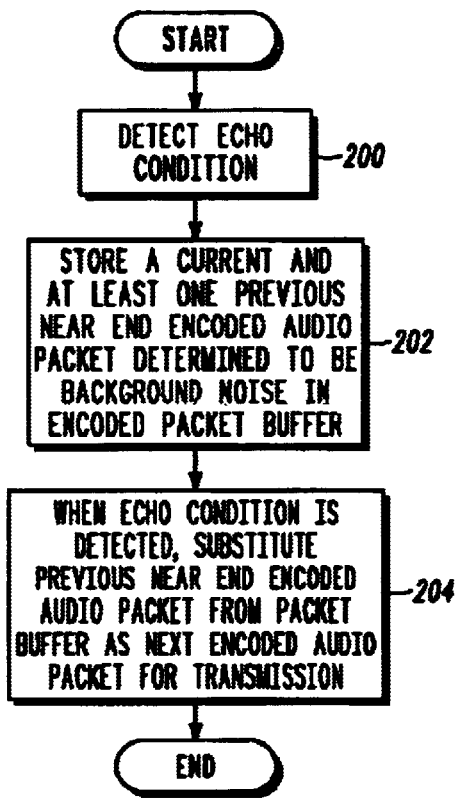
FIG. 2 is a flow chart illustrating one example of a method for providing echo cancellation between a plurality of communication units in accordance with one embodiment of the invention.

FIG. 2 illustrates a method for providing echo cancellation between a first and second communication unit in accordance with one embodiment of the invention. As shown in block 200, the method includes detecting an echo condition between first and second communication units, such as by evaluating on a per packet basis whether an echo condition occurs. This may be done, for example, by the echo detector 22 or any other suitable mechanism. As shown in block 202, the method includes storing a current near end encoded audio packet 12 determined to be background noise in the packet buffer 26 and at least one previous near end encoded audio packet 42 determined to be background noise in the buffer 26. This is done in response to determining whether a corresponding decoded near end audio packet contains a suitable level of background noise. This may be determined, for example, by the adaptive background noise floor estimator 24 or by any suitable mechanism.

As shown in block 204, the method includes, when an echo condition is detected with respect to a current near end encoded audio packet, substituting at least one previous near end encoded audio packet 42 stored in the buffer 26 as a next encoded packet 16 for transmission. As such, packets detected to have echo are replaced with encoded packets that have been determined to include background noise. This is performed without re-encoding the packets after they are decoded to determine whether they contain background noise.

Figure 3:
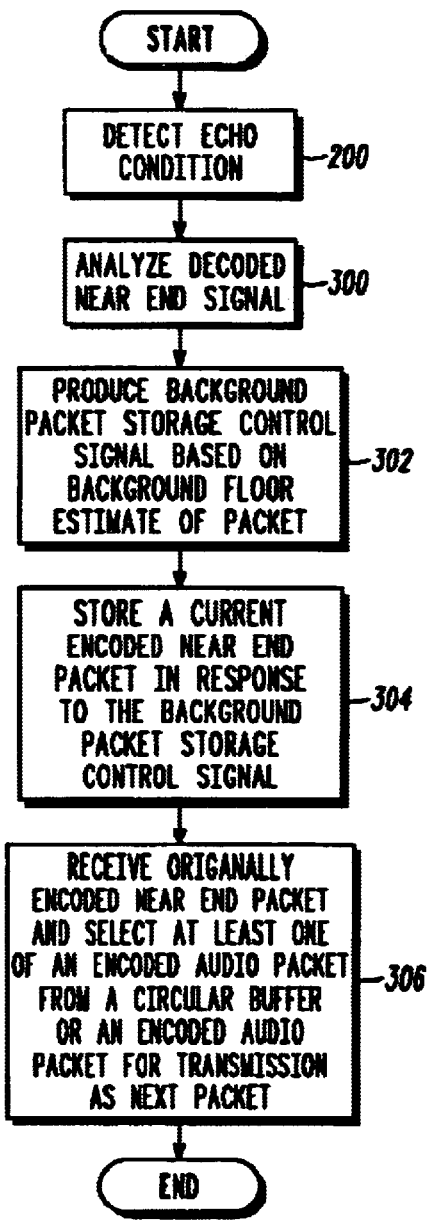
FIG. 3 is a more detailed flow chart describing an example of a method for providing echo cancellation between a plurality of communication units in accordance with one embodiment of the invention.

FIG. 3 sets forth in more detail, a method for providing echo cancellation between a first and second communication unit which includes, as shown in block 300, analyzing a decoded near end signal, such as a current near end decoded audio packet 36, to determine if the packet contains background noise. As shown in block 302, the method includes producing the background packet storage control signal 44 based on a background noise floor estimate energy level 48 wherein the background noise energy floor value is based at least in part on the energy level of the current near end decoded packet. The floor estimate may be based on an average of other background noise packets (such as 10 packets or other suitable number) or may be based on a weighting of other background noise packets if desired.

As shown in block 304, the method includes storing a current encoded near end audio packet 12 in the buffer 26 in response to the background packet storage control signal 44. As shown in block 306, the method includes receiving originally encoded near end packets and selecting at least one of an encoded audio packet from the buffer 26 or the current near end encoded audio packet 12 for transmission as the next packet. This may be carried out, for example, by the packet selector 28 or any other suitable mechanism.

Figure 4:
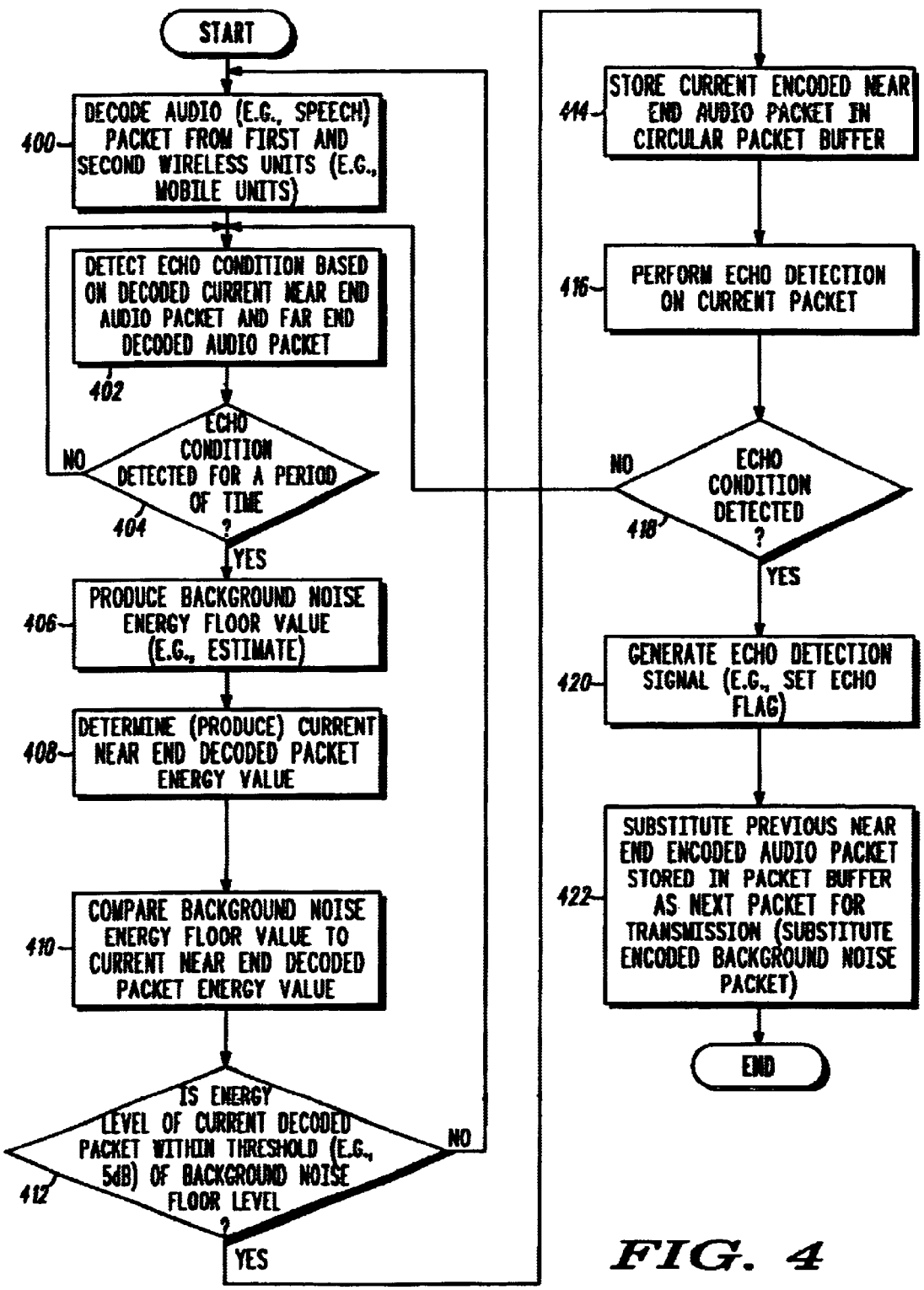
FIG. 4 is a flow chart illustrating one example of a method for providing echo cancellation between communication units in accordance with one embodiment of the invention.

FIG. 4 illustrates a flow chart of a more detailed method for providing echo cancellation between a first and second communication unit in accordance with one embodiment of the invention.

This method assumes that one iteration of the above method has occurred to place a previously received near end encoded audio packet that is determined to contain background noise, into the buffer 26. When another packet is received, the method includes, for example, as shown in block 400, decoding the current near end encoded audio packet 12 and a far end encoded audio packet 14. As shown in block 402, the method includes detecting whether an echo condition exists between the first and second communication units based on the decoded current near end audio packet 36 associated with the first communication unit and the far end decoded audio packet 38 associated with the second communication unit. As shown in block 404, if an echo condition is not detected for a predetermined period of time the process waits for another packet to detect whether or not the next packet contains echo. However, if an echo condition is detected, the method includes producing a background noise energy floor value 48. This is shown in block 406 and may be performed in any conventional manner.

As shown in block 408, the method also includes producing an estimate of the energy value of the current near end decoded audio packet 36 by producing the current near end decoded packet energy value 50. As shown in block 410, the method includes comparing the background noise energy floor value 48 with the current near end decoded packet energy value 50. As shown in block 412, if the energy level of the current decoded packet is within a predetermined threshold such as within 5 dB of the background noise floor level value 48, the packet is determined to be a background noise packet. As such, the method includes, as shown in block 414, storing an already encoded form of the analyzed packet in the buffer 26. Hence, when a packet contains a suitable level of background noise, the method includes storing the already encoded near end encoded audio packet 12 into the circular buffer 26. As shown in block 416, the method also includes performing echo detection on a current near end decoded audio packet 36. If an echo condition is detected, as shown in block 418, the method includes generating the echo detection signal 40 as shown in block 420. Since the current packet is determined to contain echo, the method includes, as shown in block 422, substituting a previous near end encoded audio packet 42 from the buffer 26 as the next packet for transmission as a substituted packet for the current packet containing echo. As such, since a previous near end encoded packet is used as a substitute for a current packet having echo, no substantial delay is incurred. Moreover, since the packet that is being substituted is an originally encoded packet and has not undergone re-encoding, the network element can operate in a much faster and efficient manner than conventional network elements. Returning back to block 418, if an echo condition is not detected, the method includes detecting whether a next packet contains an echo condition as shown.

Preferably, although not required, the background noise encoded storage control signal 44 is updated for every packet. In addition, the echo detection signal 40 is also updated on a per packet basis.

It will be recognized that as noted the aforedescribed process can be utilized in the opposite direction in order to provide bi-directional echo cancellation capability for packet switch networks at each ISP gateway or any other suitable gateway.

The adaptive background noise floor estimator 24 operates such that if the past number of samples (corresponding to a packet length) average energy is not higher than an estimated background noise floor then the packet is determined to contain background noise. The network element 10 replaces a next received packet by a packet out of the circular buffer 26 which corresponds to an encoded background noise packet. The operation of the aforedescribed methods and apparatus provides an encoder-free generation of comfort noise packets to replace echo packets. Other advantages will be recognized by those having ordinary skill in the art.

It should be understood that the implementation of other variations and modifications of the invention in its various aspects will be apparent to those of ordinary skill in the art, and that the invention is not limited by the specific embodiments described. For example, it will be recognized that although the methods are described with certain steps, the steps may be carried out in any suitable order as desired. It is therefore contemplated to cover by the present invention, any and all modifications, variations, or equivalents that fall within the spirit and scope of the basic underlying principles disclosed and claimed herein.

What is claimed is:

1. A method for providing echo cancellation between at least a first and second communication unit wherein each of the first and second communication units are in operative communication with at least one network element comprising:

detecting an echo condition between the first and second communication units;

storing a current and at least one previous near end encoded audio packet in a buffer in response to determining whether a corresponding decoded near end audio packet contains a suitable level of background noise; and when an echo condition is detected with respect to a current near end encoded audio packet, substituting at least one previous near end encoded audio packet stored in the buffer as a next encoded audio packet for transmission.

2. The method of claim 1 wherein storing the current and at least one previous near end encoded audio packet includes storing received encoded near end audio packets determined to be background noise packets in the buffer in response to a background noise encoded packet storage control signal.

3. The method of claim 1 including steps of:

receiving a current near end decoded packet and producing a background noise energy floor value based at least in part thereon;

receiving the current near end decoded packet and producing a current near end decoded packet energy value based thereon; and producing a background noise encoded packet storage control signal based on a comparison of the background noise energy floor value and the current near end decoded packet energy value.

4. The method of claim 1 wherein the step of storing the current and at least one previous near end encoded audio packet in the buffer includes storing the current near end encoded audio packet in a circular buffer.

5. A network element comprising:

an adaptive echo detector operatively responsive to a decoded current near end audio packet associated with a first communication unit and a far end decoded audio packet associated with an echo generating second communication unit and operative to detect an echo condition;

an adaptive background noise floor estimator operatively responsive to the current near end decoded audio packet and operative to produce a background noise encoded packet storage control signal;

a circular encoded packet buffer containing previously received encoded near end audio packets determined to be background noise packets and operative to store a current near end encoded audio packet in response to the background noise encoded packet storage control signal; and a packet selector operatively coupled to the adaptive echo detector and to the circular encoded packet buffer and operatively coupled to receive the current near end encoded audio packet wherein the packet selector substitutes at least one previous near end encoded audio packet stored in the circular encoded packet buffer as a next encoded audio packet for transmission.

6. The network element of claim 5 wherein the packet selector substitutes by selecting at least one of the current near end encoded packet and an encoded audio packet from the circular encoded packet buffer in response to a detected echo condition detected by the adaptive echo detector.

7. The network element of claim 5 wherein the adaptive background noise floor estimator includes:

a background noise floor energy level estimation circuit operatively coupled to receive the current near end decoded packet and operative to produce a background noise energy floor value;

a current near end decoded packet energy estimation circuit operatively coupled to receive the current near end decoded packet and operative to produce a current near end decoded packet energy value; and a comparator circuit operatively coupled to receive the background noise energy floor value and the current near end decoded packet energy value and to produce the background noise encoded packet storage control signal based on a comparison of the background noise energy floor value and the current near end decoded packet energy value.

8. The network element of claim 5 wherein the adaptive echo detector generates an echo detection signal when an echo condition is detected and wherein the packet selector is operatively responsive to the echo detection signal to select at least one of the current encoded near end packet and an encoded audio packet from the circular encoded packet buffer as a next encoded packet for transmission.

9. The network element of claim 8 wherein the packet selector is operatively responsive to a next encoded packet signal to output at least one of the current encoded near end packet and an encoded audio packet from the circular encoded packet buffer as a next encoded packet for transmission.

10. The network element of claim 9 wherein the packet selector selects a current encoded near end packet as a next encoded packet for transmission when an echo condition is not detected.

11. The network element of claim 10 wherein the packet selector selects an encoded audio packet from the circular encoded packet buffer as a next encoded packet for transmission when an echo condition is detected.

12. A method for providing echo cancellation between at least a first and second communication unit wherein each of the first and second communication units are in operative communication with at least one network element comprising:

detecting an echo condition between the first and second communication units based on a decoded current near end audio packet associated with the first communication unit and a far end decoded audio packet associated with an echo generating second communication unit;

determining whether the decoded current near end audio packet is a background noise packet based on a background noise floor energy estimation;

when the decoded current near end audio packet is determined to contain suitable background noise, storing the current near end encoded audio packet in a circular buffer; and when an echo condition is detected with respect to a current near end encoded audio packet, substituting at least one previous near end encoded audio packet stored in the circular buffer as a next encoded audio packet for transmission.

13. The method of claim 12 including the step of storing erasure packets in the circular buffer on call start-up and subsequently storing a plurality of received encoded near end audio packets in the circular buffer.

14. The method of claim 12 including steps of:

receiving a current near end decoded packet and producing a background noise energy floor value based at least in part thereon;

receiving the current near end decoded packet and producing a current near end decoded packet energy value based thereon; and producing a background noise encoded packet storage control signal based on a comparison of the background noise energy floor value and the current near end decoded packet energy value.

15. The method of claim 14 wherein the step of storing the current and at least one previous near end encoded audio packet in the buffer includes storing the current near end encoded packet in response to the background noise encoded packet storage control signal.

16. The method of claim 12 wherein the step of storing the current and at least one previous near end encoded audio packet in the buffer includes storing the current near end encoded audio packet in a circular buffer.

17. The method of claim 12 including updating the echo determination signal on a per packet basis and updating the background noise control signal on a per decoded near end audio packet basis.

* * * * *